US006433876B1

(12) United States Patent
Kuhn

(10) Patent No.: US 6,433,876 B1
(45) Date of Patent: Aug. 13, 2002

(54) MULTIPLE WAVELENGTH OR MULTIPLE SHEAR DISTANCE QUANTITATIVE DIFFERENTIAL INTERFERENCE CONTRAST MICROSCOPY

(75) Inventor: William P. Kuhn, Tucson, AZ (US)

(73) Assignee: Optical Perspectives Group, L.L.C., Tucson, AZ (US)

( * ) Notice: Subject to any disclaimer, the term of this patent is extended or adjusted under 35 U.S.C. 154(b) by 0 days.

(21) Appl. No.: 09/580,537

(22) Filed: May 26, 2000

Related U.S. Application Data

(60) Provisional application No. 60/137,061, filed on Jun. 1, 1999.

(51) Int. Cl.⁷ ............................................... G01B 9/02
(52) U.S. Cl. ........................ 356/516; 356/520; 356/495
(58) Field of Search ................................. 356/516, 520, 356/485, 489, 492, 495, 370, 371

(56) References Cited

U.S. PATENT DOCUMENTS

| 3,873,207 A | | 3/1975 | Bryngdahl |
| 4,512,661 A | * | 4/1985 | Claus et al. ................. 356/492 |
| 4,741,620 A | * | 5/1988 | Wickramasinghe ......... 356/489 |
| 4,832,489 A | | 5/1989 | Wyant et al. |

OTHER PUBLICATIONS

Nomarski et al, "Application à la métallographis des méthodes interférentielles à deux ondes polarisées", Revue de Metallurgie, No. 2, pp. 121–134 (1995).
Hong et al, "Three–dimensional optical profiler using Nomarski interferometry", SPIE pp. 150–153 (1994).
Lessor, et al, "Quantitative surface topography determination by Nomarski reflection microscopy. I. Theory", J. Opt. Soc. Am., vol. 69, No. 2, pp. 357–366 (Feb. 1979).
Klein, "Optics", John Wiley & Sons, Inc. pp. 450–451 (1970).
Handbook of Optics, vol. II, $2^{nd}$ ed., McGraw–Hill, Ch. 17, pp 17.32–17.37.

(List continued on next page.)

Primary Examiner—Samuel A. Turner
(74) Attorney, Agent, or Firm—David W. Collins

(57) ABSTRACT

A differential interference contrast (DIC) microscope system is provided comprising: (a) an illumination source for illuminating a sample; (b) a lens system for viewing the illuminated sample, including an objective, defining an optical axis; (c) a DIC prism having a shear angle for separating an input light beam into two, orthogonally polarized output beams that are separated by the shear angle; (d) at least one detector system for receiving a sample image; (e) a mechanism for modulating the phase of the DIC image; (f) a mechanism for selecting the wavelength of light used in acquiring at least two sets of DIC data taken in a single shear direction; and (g) a mechanism for manipulating the multiple DIC data sets to synthesize data that appear to have been taken at a longer synthetic wavelength. The various approaches disclosed and claimed herein permit the measurement of surfaces with a greater slope than is possible with a single wavelength or shear distance. The methods disclosed herein are applicable to measurement of slope in a single direction or in two directions. The disclosed methods are also compatible with the methods and devices of wavelength multiplexed quantitative DIC microscopy for obtaining slope data in two directions. An additional benefit of the disclosed techniques is the retention of the measurement sensitivity of a shorter wavelength or longer shear distance while increasing the measurement range corresponding to the long, effective wavelength obtained. However, the measurements are still limited to within the depth of focus of the microscope.

13 Claims, 10 Drawing Sheets

OTHER PUBLICATIONS

Creath, "Optical Shop Testing", Wiley, $2^{nd}$ ed., Ch. 17, p. 698 (1992).

Mantravadi, "Lateral Shearing Interferometers", Optical Shop Testing, John Wiley & Sons, Inc., $2^{nd}$ ed., Ch. 4, pp. 123–172 (1992).

Ooki et al, "Differential interference contrast microscope with differential detection for optimizing image contrast", Applied Optics, vol. 35, No. 13, pp. 2230–2234 (May 1, 1996).

Shimada et al, "Optical Surface Microtopography Using Phase–Shifting Nomarski Microscope", SPIE, vol. 1332, Optical Testing and Metrology III: Recent Advances in industrial Optical Inspection pp. 525–529 (1990).

Hartmen et al, "Quantitative surface topography determination by Nomarski reflection microscopy, 2: Microscope modification, calibration, and planar sample experiments", Applied Optics, vol. 19, No. 17, pp. 2998–3009 (Sep. 1, 1980).

Mansuripur, "Parallel Processing", Optics & Photonics News, pp. 34–38 (Sep. 1999).

* cited by examiner

MULTIPLE WAVELENGTH OR MULTIPLE SHEAR DISTANCE QUANTITATIVE DIFFERENTIAL INTERFERENCE CONTRAST MICROSCOPY

CROSS-REFERENCE TO RELATED APPLICATIONS

The present application is a non-provisional application, and claims priority based on provisional application, Serial No. 60/137,061, filed on Jun. 1, 1999.

The present application is related to application Ser. No. 09/579,733, filed on even date herewith. That application is directed to the need to obtain efficiently, quantitative slope data from a differential interference contrast (DIC) microscope in two directions. The present application is also related to application Ser. No. 09/580,470, also filed on even date herewith. That application is directed to extending the range of a quantitative DIC microscope to permit the measurement of samples having height variations greater than the depth of focus (DOF) of an objective.

TECHNICAL FIELD

The present invention is directed generally to optical microscopy and in particular addresses how to increase the effective wavelength of a DIC measurement and thereby increase the slope of a surface that can be measured without ambiguity by combining data taken at two or more wavelengths or two or more shear distances. This measurement range is still limited by the depth-of-focus of the objective.

BACKGROUND ART

Many manufacturing processes require the measurement of microscopic surface topography. Applications include, but are not limited to, the control of surface finish in machined parts and the inspection of semiconductor wafers. Phase shifting interference, and more recently, white-light interference (WLI) microscopes are widely used to measure surface topography with lateral resolutions from less than one micron to tens of microns and height resolutions to less than a nanometer.

Phase shifting and WLI microscopes use optical interference between a reference surface and a sample to produce an interference image with fringes of constant height. Typical microscope types are based upon Mirau or Michelson interference objectives. A phase shifting interference microscope modulates the phase of the interference pattern by changing the relative length of the sample and reference arms of the interferometer. The acquisition and processing of a set of phase shifted interference images permits the calculation of the height of the sample at each pixel. The methods of phase shifting are well known.

WLI microscopes have superceded the use of phase shifting interference microscopes in almost all applications. One difference between a WLI microscope and a phase shifting microscope is the requirement for a short coherence length source in the former and its optional use in the latter. A major hardware difference between the two devices is the substantially larger vertical scan range of a WLI microscope—as much as hundreds of microns rather than less than one micron. The practical difference between the two types of microscopes is that a WLI microscope generates large amounts of data and uses substantially different processing algorithms to obtain a much greater measurement range than phase-shifting microscopes, with only a modest loss in precision. However, both microscopes share a significant problem—extreme sensitivity to environmental effects, especially vibration and air turbulence.

The environmental sensitivity of phase shifting and WLI interference microscopes is due to the non-common path nature of the test and reference arms of the instrument and the inherent sensitivity of optical interference. A Nomarski or differential interference contrast (DIC) microscope maintains the inherent measurement sensitivity of optical interference while removing the extreme environmental sensitivity because the two interfering light paths are nearly identical or common-path.

One of the earliest publications describing a DIC microscope is "Application á la métallographie des méthodes interférentielles á deux ondes polarisées", by G. No-marski and A. R. Weill, Revue de Matallurgie, LII, #2, 1955, pp. 121–134. However, a DIC microscope is typically considered to be for qualitative use only. The reason for this is somewhat understandable. A WLI microscope produces fringes that are contour lines of constant height, just like a topographic map—except the contour spacing is on the order of 0.3 microns rather than meters or more. A DIC microscope produces fringes that are contours of constant slope in one direction. There are two difficulties with using an interferometer that produces slope fringes. First, slope fringes are difficult to visually interpret and second, slope must be measured in two directions to fully reconstruct a surface.

When personal computers became widely available, the natural course of action was to automate the processing of what people were used to looking at—fringes of constant height. In modern manufacturing processes, visual inspection of images is avoided not only because it is slower but also because it is less reliable, precise and accurate than automated image processing. Modern computers are quite capable of performing the necessary computations on slope data from a DIC microscope to obtain surface topography data making it possible to take advantage of the environmental insensitivity of a DIC microscope.

In qualitative DIC microscopy, a rotating polarizer in conjunction with a quarter-wave plate is used to modify the image produced by the microscope so that features of interest are clearly visible. Rotating the polarizer changes the relative phase of the two interfering beams providing the ability to phase shift (phase modulate) the interference image present on the detector. Devices based upon liquid-crystal technology may be used in place of the rotating polarizer and may optionally incorporate the quarter-wave plate as part of the liquid-crystal device. Multiple, phase shifted DIC images can be acquired and then processed using standard techniques from phase shifting interferometry to produce a quantitative measure of sample surface slope, where the slope measured is in the shear direction of the DIC prism. Quantitative DIC measurements were first presented in a paper by Hong et al in July 1993 at the annual SPIE conference; see, Gao Hong et al, "Three-dimensional optical profiler using No-marski interferometry," in SPIE, Vol. 1994, pp. 150-153, Advanced Optical Manufacturing and Testing IV, published Febuary 1994, presented Jul. 11–16 1993 in San Diego, Calif. by Robert E. Parks (ISBN 0-8194-1243-0).

Delbert L. Lessor et al, in "Quantitative surface topography determination by Nomarski reflection microscopy. 1. Theory," Journal of the Optical Society of America, Vol. 69, No.2, pp. 357–366 (Febuary 1979) presented early theoretical work in 1979. Lessor et al; provide basic theory and propose rotating the sample to obtain slope data in two orthogonal directions; notably, this paper was not referenced by Hong et al.

A major limitation of a DIC microscope as compared to a WLI microscope is the need, in general, for rapid, robust measurement of slope in two directions. Another broadly applicable constraint is that a phase shifted interference and a DIC microscope are both limited to measurements within the depth of focus (DOF) of the objective, while WLI can go far beyond the DOF.

The present invention addresses how to obtain, rapidly and robustly, the measurement of surfaces with a greater slope than is possible with a single wavelength or shear distance.

The detailed discussion begins with a disclosure about the use of wavelength multiplexing to obtain slope data in two directions in a DIC microscope.

DISCLOSURE OF INVENTION

In accordance with the present invention, a differential interference contrast (DIC) microscope system is provided comprising:

(a) an illumination source for illuminating a sample;

(b) a lens system for viewing the illuminated sample, including an objective, defining an optical axis;

(c) a DIC prism having a shear angle for separating an input light beam into two, orthogonally polarized output beams that are separated by the shear angle;

(d) at least one detector system for receiving a sample image;

(e) a mechanism for modulating the phase of the DIC image;

(f) a mechanism for selecting the wavelength of light used in acquiring at least two sets of DIC data taken in a single shear direction; and (g) a mechanism for manipulating the multiple DIC data sets to synthesize data that appear to have been taken at a longer synthetic wavelength.

The various approaches disclosed and claimed herein permit the measurement of surfaces with a greater slope than is possible with a single wavelength or shear distance. The methods disclosed herein are applicable to measurement of slope in a single direction or in two directions. The disclosed methods are also compatible with the methods and devices of wavelength multiplexed quantitative DIC microscopy disclosed in above-referenced application Ser. No. 09/579,733 for obtaining slope data in two directions. An additional benefit of the disclosed techniques is the retention of the measurement sensitivity of a shorter wavelength or longer shear distance while increasing the measurement range corresponding to the long, effective wavelength obtained. However, the measurements are still limited to within the depth of focus of the microscope.

Other objects, features, and advantages of the present invention will become apparent upon consideration of the following detailed description and accompanying drawings, in which like reference designations represent like features throughout the FIGURES.

BRIEF DESCRIPTION OF THE DRAWINGS

The drawings referred to in this description should be understood as not being drawn to scale except if specifically noted.

BEST MODES FOR CARRYING OUT THE INVENTION

Reference is now made in detail to a specific embodiment of the present invention, which illustrates the best mode presently contemplated by the inventor for practicing the invention. Alternative embodiments are also briefly described as applicable.

1. DIC Background

The advantage of DIC measurement methods over typical interferometric microscopes is due to common path design of the interferometer and resultant insensitivity to vibration and other environmental effects. However, the data obtained by DIC measurements represents surface slope rather than surface height. Additionally, it is necessary to measure slope in two directions and integrate to permit the unambiguous determination of height a general surface. It is preferable that the slope data are in two orthogonal directions; however, the requirement is that the directions are not parallel.

Hong et al, in section 3 of their above-referenced paper, describe how to obtain height profiles in one direction (x-shear direction). They then state "The line profiles in y direction can be obtained by the same procedure for the x direction except shearing direction." The authors do not state directly that the prism can be rotated.

It is well-known to those practiced in the art of microscope design that there are specific orientations required for the various components of a DIC microscope: prism, analyzer, and quarter-wave plate. A second polarizer is rotated to control the relative phase of the two beams and thereby modifying the image. Once the components, except for the DIC prism (e.g. Wollaston or Nomarski prism), are fixed in location, there are two permitted, orthogonal orientations of the prism; see, e.g., M.V. Klein, *Optics*, p. 450, John Wiley (1970). Visual instruments are fixed at one of the two allowed orientations. As a note, rotating a prism 180 degrees about the optical axis changes the sign of the slope estimate but not the magnitude; hence there are actually four allowed orientations of the prism.

It appears that the basic idea of quantitative DIC microscopy is in the public domain because of papers by both, Lessor et al and Hong et al. The requirements for slope data in two directions, and the two allowed (orthogonal) positions of the prism are all well-known, as shown by the references. Adding a motor to move between the two positions is obvious; after all, Hong et al motorized a polarizer to rotate it to any desired position.

Figure 1:
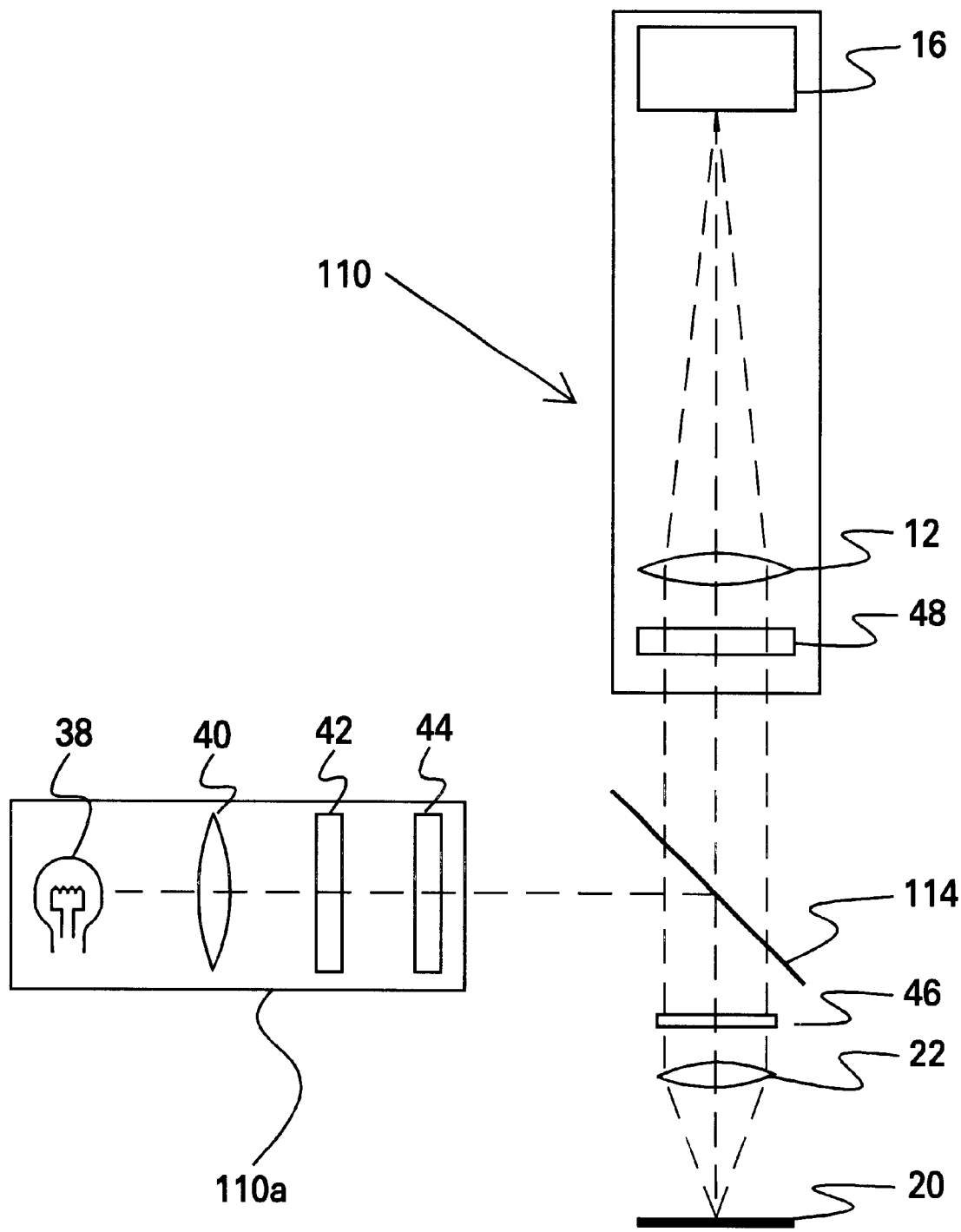
FIG. 1 is a schematic diagram of a DIC microscope.

FIG. 1 shows a schematic DIC microscope and is described below. The DIC microscope 110 comprises an illumination source 38, a condenser lens 40 providing Kohler illumination, a rotating linear polarizer 42, a quarter-wave plate 44, an amplitude beam splitter 114, a DIC. prism 46, a microscope objective 22, an analyzer 48, an optional tube lens 12, and a detector 16. The illumination of the sample 20 is generated in the illumination arm 110a of the DIC microscope 110. Rotating linear polarizer 42 modulates (shifts) the phase of DIC image on detector 16. The beam splitter 114 couples the illumination onto the sample 20 and the resulting illuminated image is directed to the detector 16 in the detector arm 110b.

The illumination source 38 can be a laser, light emitting diode, or incandescent source. While one condenser lens 40 for providing Kohler illumination is shown, more than one lens may be used to permit adjustment of the system aperture, projection of a field stop or for other reasons. The quarter-wave plate 44 has its fast axis at 45 degrees to the shear direction of the DIC prism 46. The DIC prism 46 may comprise a Nomarski, Wollaston or other suitable prism. A DIC prism uses birefiingent materials to split each input ray into two, orthogonally polarized output rays that are separated by the shear angle of the prism. The plane of splitting of the rays is at the back focal plane (BFP) of the objective 22. The microscope objective 22 is typically an infinite conjugate objective, but this is not necessarily the case. The analyzer 48 comprises a fixed polarizer at 45 degrees to the shear direction of the prism 46 to take approximately equal amounts of light from two output polarizations produced by the DIC prism. The optional tube lens 12 is used for focusing if an infinite conjugate objective 22 is used. The detector 16 is typically a CCD camera. A sample 20 is in the usual location relative to the objective lens 22.

2. Wavelength Multiplexing

It is desirable to obtain slope data in two directions from a single sample 20 without moving the sample. It is assumed that a single microscope objective 22 is used to obtain slope data in two directions, since there is not, in general, enough space to use two objectives.

One method of obtaining slope data in two directions is to acquire a data set for one shear direction and calculate slope. Then rotate the prism and repeat the slope measurement for the second shear direction. There are problems with rotating prism 46:

1. The prism is close to the objective and thus inconvenient to rotate in a compact device.
2. A motion control axis is somewhat expensive.
3. The quality of measurement is dependent upon a repeatable prism orientation.
4. It takes time to rotate the prism.
5. The moving parts generate particulates that are undesirable for many metrology applications.
6. Depending upon the prism design, rotating the prism to obtain the two different shear directions shifts the image position on the detector. Additional software, calibration and processing time are required to register the data between the two shear directions.

The operating principles of a DIC microscope 110 limit the approaches that can be used to obtain slope data in two directions without moving the sample 20. A DIC prism uses birefringent optical materials to produce two beams, which are orthogonally polarized and separated by the shear angle. Polarization optics (e.g. polarizer and quarter-wave plate) control the relative phase between the two beams. A polarization state can be completely described by two complex numbers that are the amount of two basis polarizations (vectors). The two basis vectors that are usually used to represent any particular polarization state are horizontal and vertical, linearly polarized light. The two output beams of a DIC prism are orthogonal, linearly polarized light. Hence, there are no additional polarization states that can be used to select a second shear direction. Therefore, data with a second shear direction requires a change either in the sample orientation or shear direction of the microscope.

The following text describes ways that multiplex shear direction by wavelength to obtain slope data in two directions that do not rotate the prism or samples.

3. Duplicate Microscopes

Figure 2:
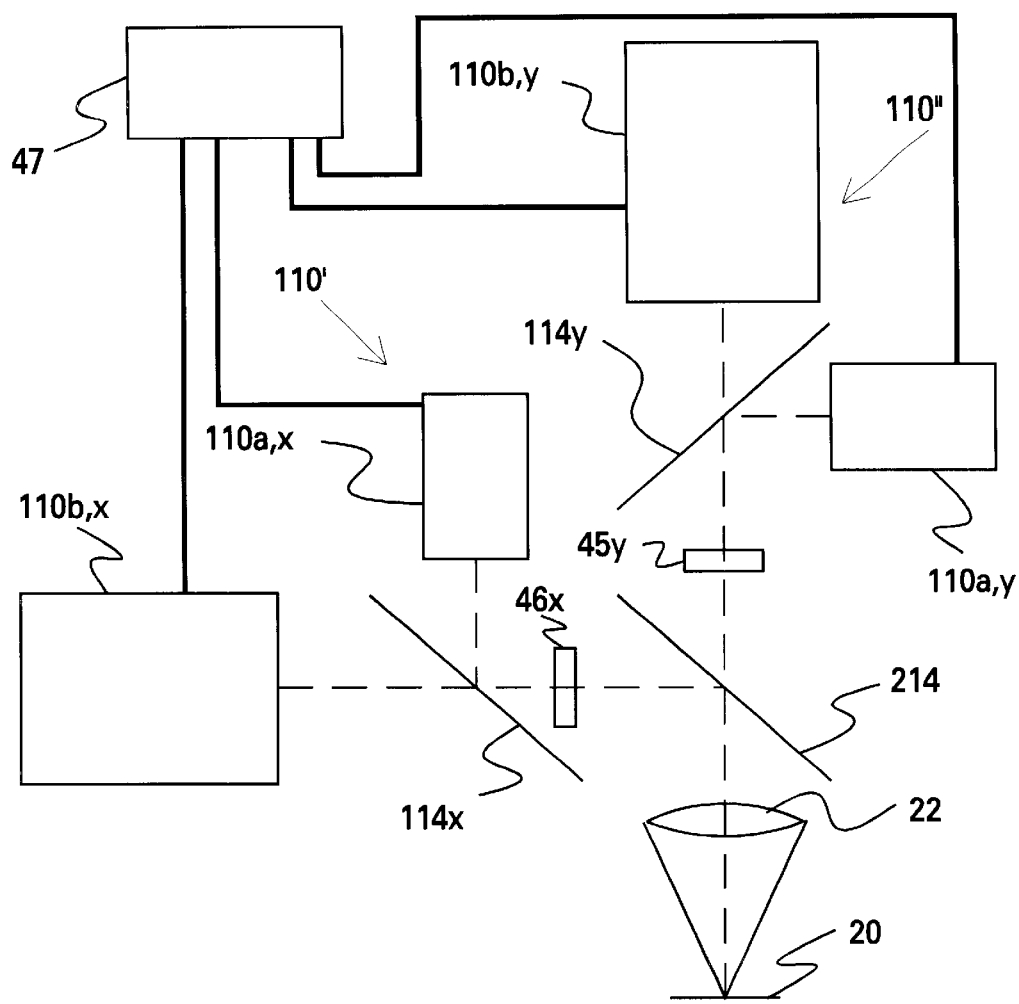
FIG. 2 is a schematic diagram of two DIC microscopes with a single, shared objective and orthogonal shear directions, with each microscope operating at a different wavelength that is separated by the beam splitter.

In accordance with one embodiment of the present invention, a wavelength selective beam splitter 214 is inserted between the prism 46 and objective 22 (see FIG. 2). The result is two microscopes 110with a single, shared objective 22. The microscopes 100', 110" are the shear obtained by each is orthogonal. Microscope 110' comprises illumination arm 110ax and detection arm 110bx, along with beam splitter 114x and prisim 46x, while microscope 110" comprises illumination arm 110ay and detection 110by, along with beam splitter 114y and prism 46y. The two wavelength bands can be close to each other but are not overlapping.

A processing means, or mechanism, 47 comprises a computer including an image capture device (e.g., frame grabber), phase modulation control device (e.g., motor and controller), and software to control the phase modulation device, and acquire and process the DIC image data. The image capture device is connected to the detector 16 and the phase modulation control device is connected to the rotating linear polarizer 42 or other phase modulation device (e.g. liquid crystal device). Additionally, the processing mechanism 47 may include an interface to control or to select the wavelength of the source 38. A virtual reference surface may be stored and utilized in the processing mechanism 47 as well.

The key idea is to use the wavelength of the light to enable multiplexing of the shear direction through the objective 22. Microscope 110' measures slope in the x direction at a wavelength $\lambda_a$, while microscope 110" measures slope in the y direction at a wavelength $\lambda_b$.

4. Multiplex the DIC Prism

Figure 3A:
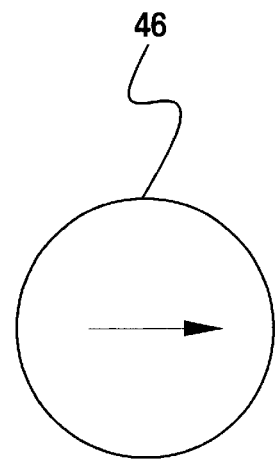
FIG. 3a is a schematic diagram of a normal DIC prism.
Figure 3B:
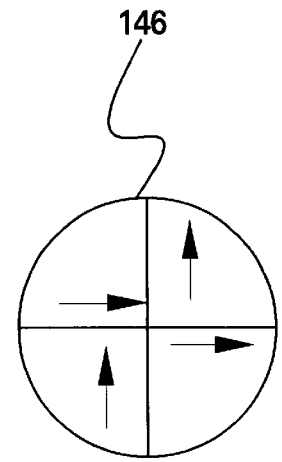
FIG. 3b is a schematic diagram of a dual shear direction or multiplexed prism.

A modification to the above approach is to replace the prism 46 in FIG. 1 (see FIG. 3a, which depicts a single prism and no quadrants) with a prism 146 made in four quadrants, as shown in FIG. 3b. Opposing quadrants have the same shear direction and adjacent quadrants have orthogonal shear directions. Additionally, a wavelength-selecting filter 124 is placed over the quadrants so that each shear direction uses a different wavelength of light. Finally, a wavelength selective beam splitter 214 is added after the tube lens 12 and two detectors 16a, 16b are used as in FIG. 4.

It is possible to use either band-pass or band-stop filters on the prism 146. Band-pass filters are compatible with a source that has the two wavelength bands of interest and may or may not have anything else in the spectrum. Band-stop filters are compatible with a source having only the two wavelength bands of interest and no others during the DIC data acquisition. Other wavelengths may be present at other times.

Figure 4:
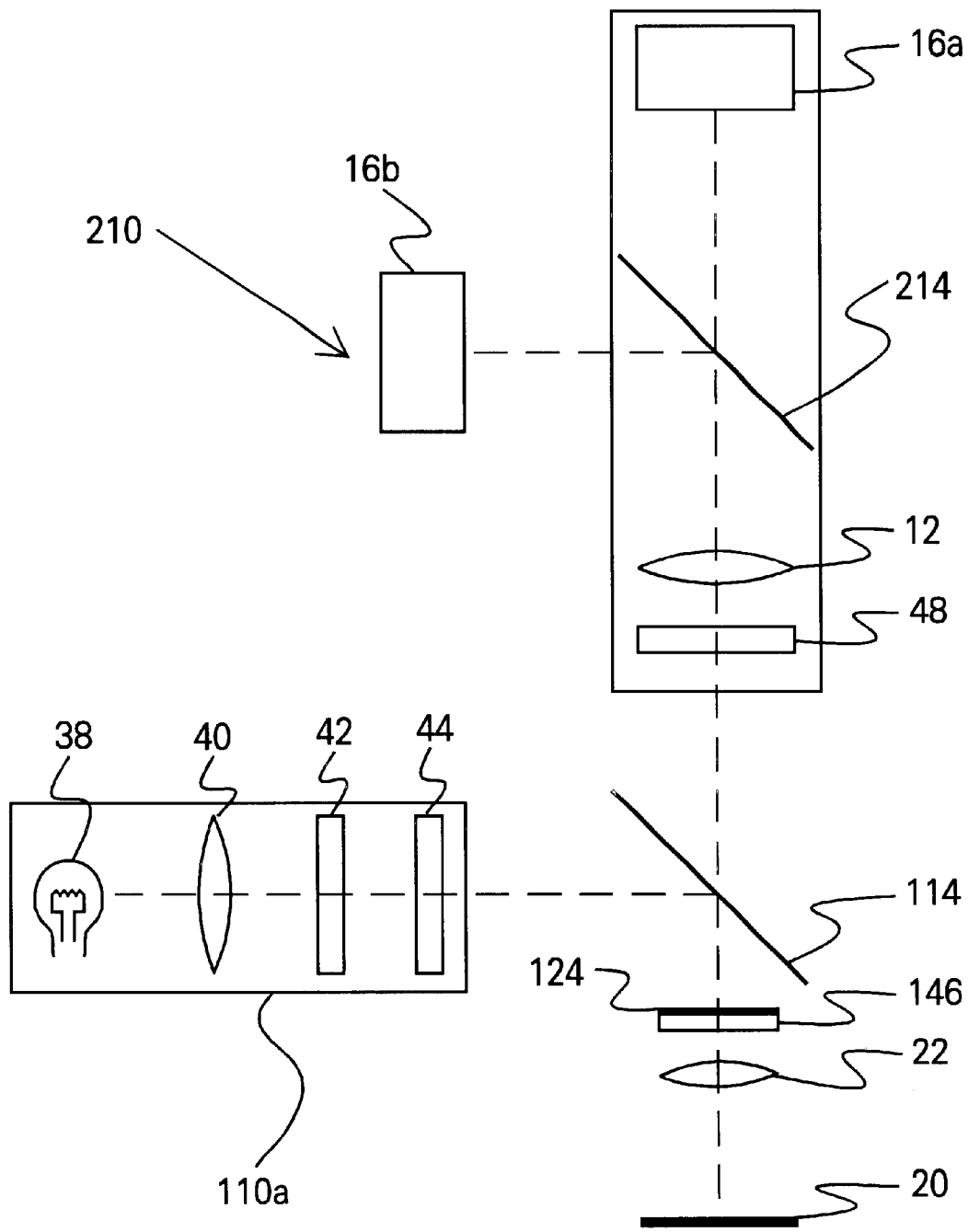
FIG. 4 is a schematic diagram of a DIC microscope modified to have a multiplexed prism, a wavelength selective beam splitter to match the prism, and two detectors.

The use of a single "multiplexed" prism 146 is helpful in that the overall optical system 210 becomes simpler, as shown in FIG. 4. No movement is required on the prism 146 and data can be acquired in both directions simultaneously. The maximum aperture diameter of the microscope objective is unchanged, though only about half of the aperture area is available for each wavelength considered individually so that the resolution of the microscope will be minimally affected. The reduced light throughput of the system 210 may be limiting in some applications such as with weakly reflecting objects.

Potential drawbacks of this approach are:
1. Difficulty in making the four-piece prism 146.
2. Stray light from the prism edges.
3. Reduction in aperture size (down by slightly more than half for each wavelength).
4. Reduced resolution of the system due to reduced aperture area.

This approach is simpler than duplicating two entire microscopes 110', 110", as originally contemplated in Method 1 (FIG. 2). Also, the need to place a beam splitter 214 between the objective 22 and prism 46 is removed, and this is harder as the magnification is increased.

5. DFOV Optics Used with Two DIC Prisms

Figure 5:
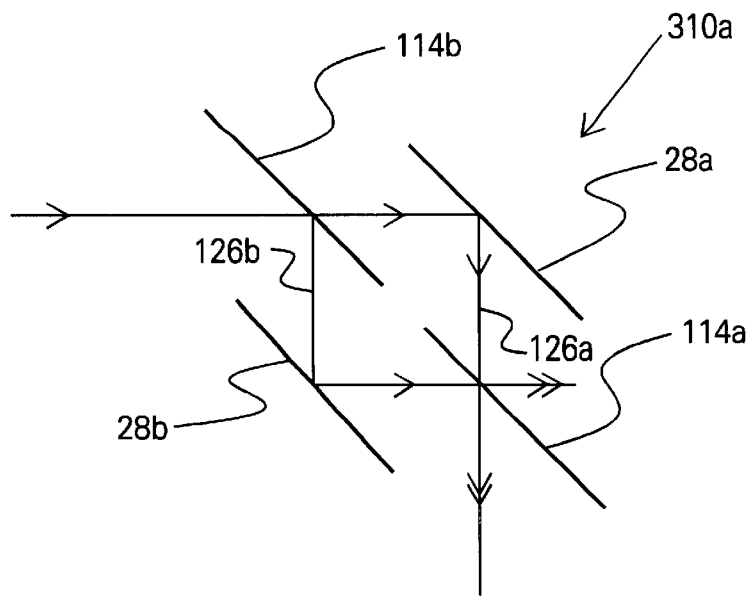
FIG. 5 depicts a dual field-of-view optics (DFOV) optics module.

FIG. 5 shows the dual field-of-view (DFOV) optics 310a comprised of two mirrors 28a, 28b and two beam splitters 114a, 114b and arranged to produce two, overlapping copies 126a, 126b of the input beams 126. For the applications considered herein, at least one of the beam splitters 114a, 114b is wavelength selective or else a wavelength selective filter is in both paths.

Figure 6:
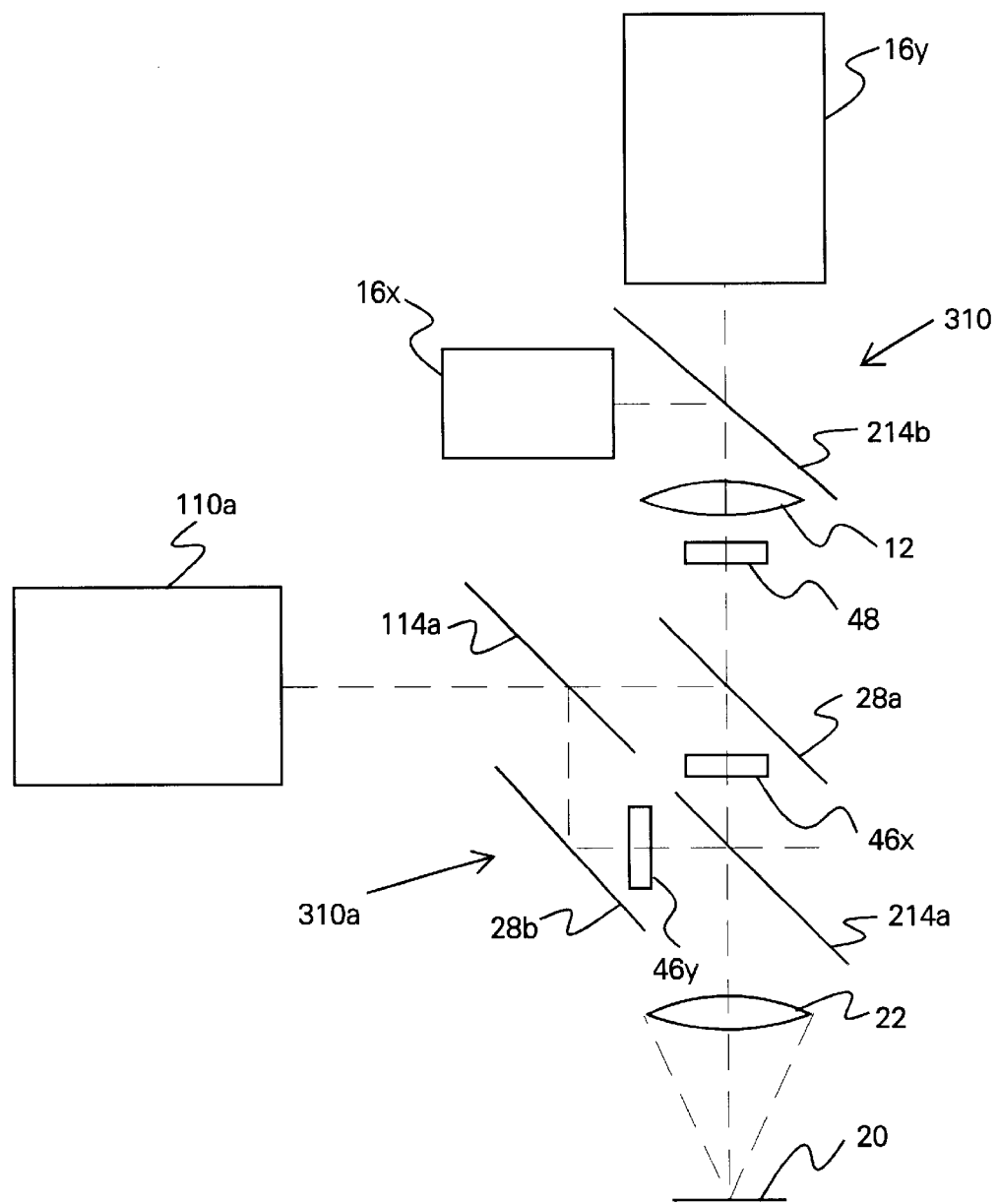
FIG. 6 depicts a dual prism alternative to the multiplexed prism that uses a DFOV optics module.

FIG. 6 shows the DFOV optics 310a used with dual DIC prisms 46x, 46y. The microscope system 310 comprises the light source and polarization modulation devices 110a described above (illumination source 38, lenses 40, field stop, rotating polarizer 42, and quarter-wave plate 44 ), amplitude beam splitter 114, two mirrors 28a, 28b, two prisms 46x, 46y, a first wavelength selective beam splitter 214a, objective 22, an analyzer 48, an optional tube lens 12, a second wavelength beam splitter 214b, and two detectors 16x, 16y. The illumination of the sample 20 is generated in the illumination arm 110a of the microscope 310.

Prism 46x is for generating x shear and prism 46y is for generating y shear. The shear directions of the two prisms 46x, 46y are typically orthogonal, but they could also be in the same direction and vary in amount or sign of shear. As above, the analyzer 48 is typically fixed at 45 degrees to the shear direction of the prisms. The second wavelength selective beam splitter 214b works in conjunction with the first wavelength selective beam splitter 214a to select shear direction. Two detectors are provided, with detector 16x for detecting shear in the x direction and detector 16y for detecting shear in the y direction.

There are many alternatives to using a wavelength selective beam splitter 214a. For example an amplitude splitter 114 can replace 214a and a thin film, narrow band filter can be coated onto the DIC prisms 46x, 46y. However, the use of a second amplitude splitter will reduce the light throughput of the system.

A problem with placing beam splitter 214a between the prism 46 and objective 22 is the limited amount of space. However, it is possible to design prisms with the apparent plane of splitting of the polarized output rays to be in front or behind the prism by a significant distance. Consider the Nikon CF objective lenses for DIC applications. There are four DIC prisms in the Nikon catalog, each of which is appropriate for use with one or more objectives. The distance from prism to objective is fixed by the turret design; however, the range of focal lengths is from 2 to 40 mm, suggesting a large range of back focal plane positions and correspondingly large range of distances between the prisms and their apparent plane of splitting.

Figure 7:
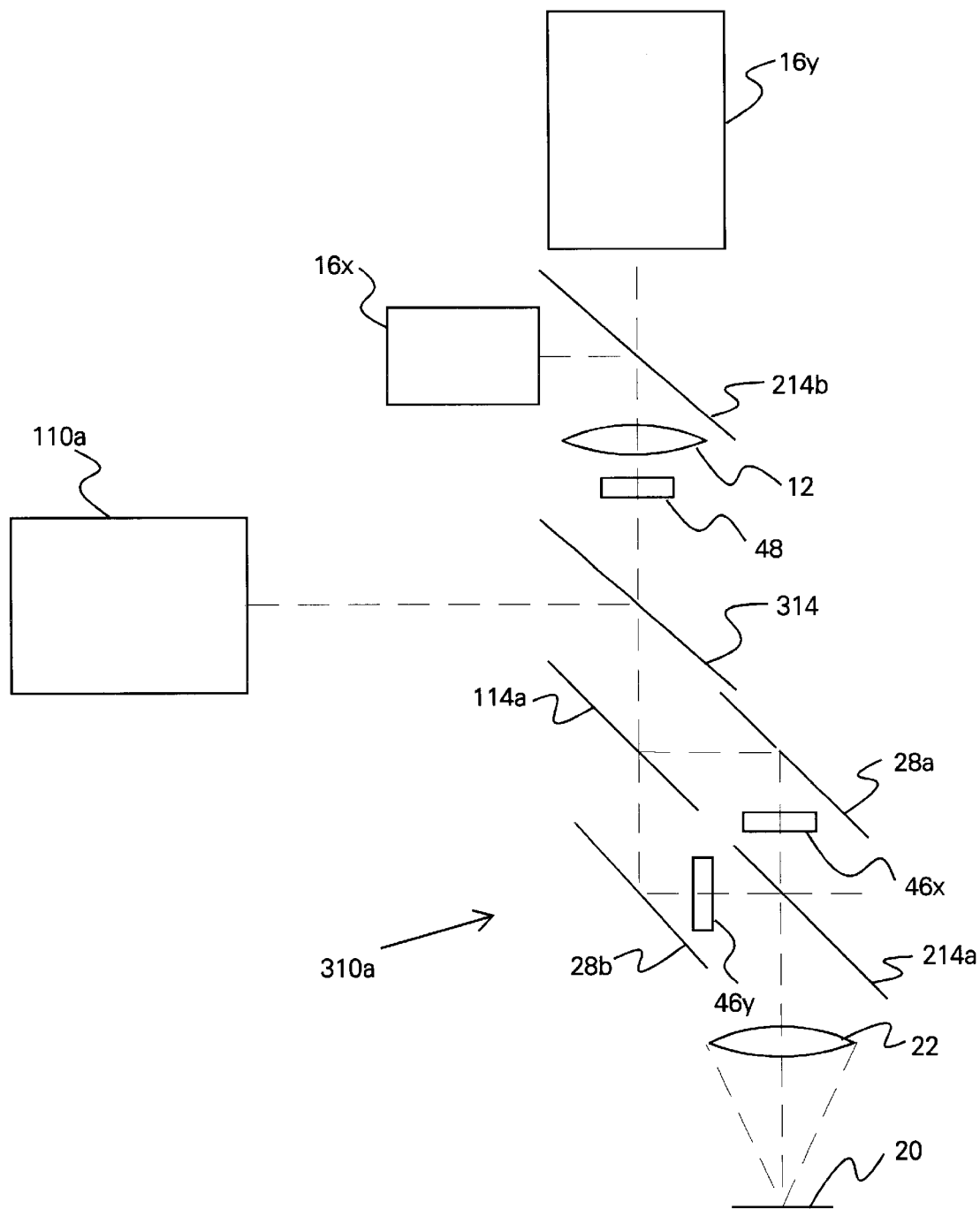
FIG. 7 depicts a modification to the dual prism design shown in FIG. 6 so that the DFOV optics and prisms can move with the objective as a unit.

A limitation of the design exemplified in FIG. 6 is that it is not practical to move, as a unit, the prisms 46x, 46y and the objective 22 for focusing because of the misalignment that will occur. Moving the objective alone will change the distance between the prisms 46x, 46y, limiting either the accuracy of the measurement or the allowable range of focus motion. One means of increasing the useful focus travel range is to compensate the measurements by a virtual reference surface stored in software that is a function of focal position (variable distance between the prism 46 and objectives 22) rather than a fixed array of single values. The virtual reference surface is described in more detail later. The second solution is shown in FIG. 7, where the design has been modified by the addition of amplitude beam splitter 314 so that the entire DFOV optics 310a and objective 22 can be moved as a unit to permit focusing or long range scanning while keeping objective 22 to prisms 46x, 46y spacing constant.

Figure 8:
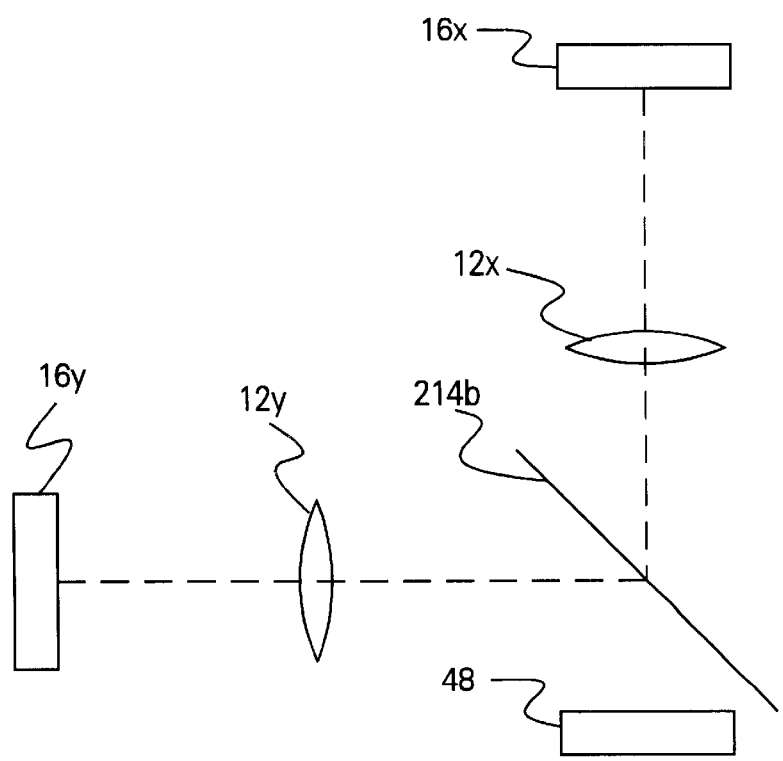
FIG. 8 depicts a modification to the detector arm that uses two tube lenses placed after a wavelength selective beam splitter.

FIG. 8 shows alternate detector arm layout. Rather than place a single tube lens 12 before wavelength selective beam splitter 214b, two tube lenses 12x, 12y are placed after the beam splitter 214b, one in each arm x, y, respectively. Similarly, the polarizer 48 can be placed before or after the beam splitters 214 to optimized performance for particular applications.

Figure 9:
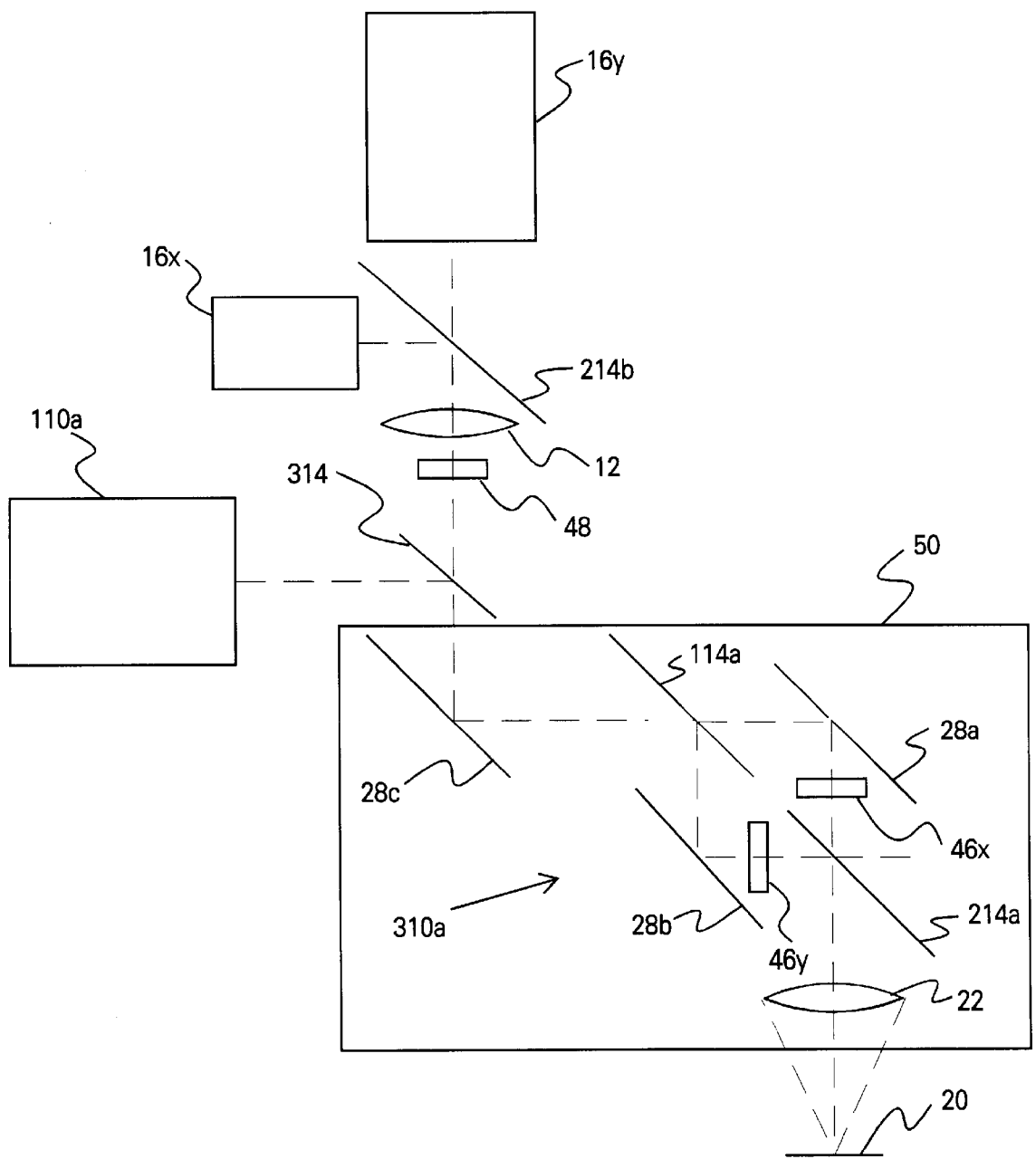
FIG. 9 depicts a modification to the DFOV optics and objective to maximize the use of available light.

FIG. 9 shows an alternate layout of the DFOV optics that is moveable as a unit 50. This version adds mirror 28c and replaces an amplitude splitter 114 with a wavelength selective beam splitter 214. The benefit of this design is that three wavelength selective beam splitters are used such that all may have the same optical properties. Using a wavelength selective beam splitter in all locations except at the intersection of the source and detector arms, permits not only the wavelength multiplexing of shear direction but also the maximum use of the available light.

6. Prism Slider

A slider (not shown) can be used to hold one or more DIC prisms, filters, clear apertures or combinations to obtain varying amounts and directions of shear or other functions. This can be done instead of or in conjunction with the DFOV optics. An objective turret (not shown) can also be used to select different objectives for different magnifications.

7. Wavelength Multiplexed DIC with Sequential Data Acquisition

A fundamental benefit of a wavelength multiplexed DIC microscope is the acquisition of slope data in two shear directions without moving prism 46. Hence, the alignment of the system is fixed during manufacture. Additionally there is no need for a motion system to rotate or exchange the prism to change shear direction. However, the reduced data acquisition time and fixed alignment due to simultaneous data acquisition is not necessary in all situations; for example when sample positioning time is large relative to data acquisition time or cost must be minimized.

Figure 10:
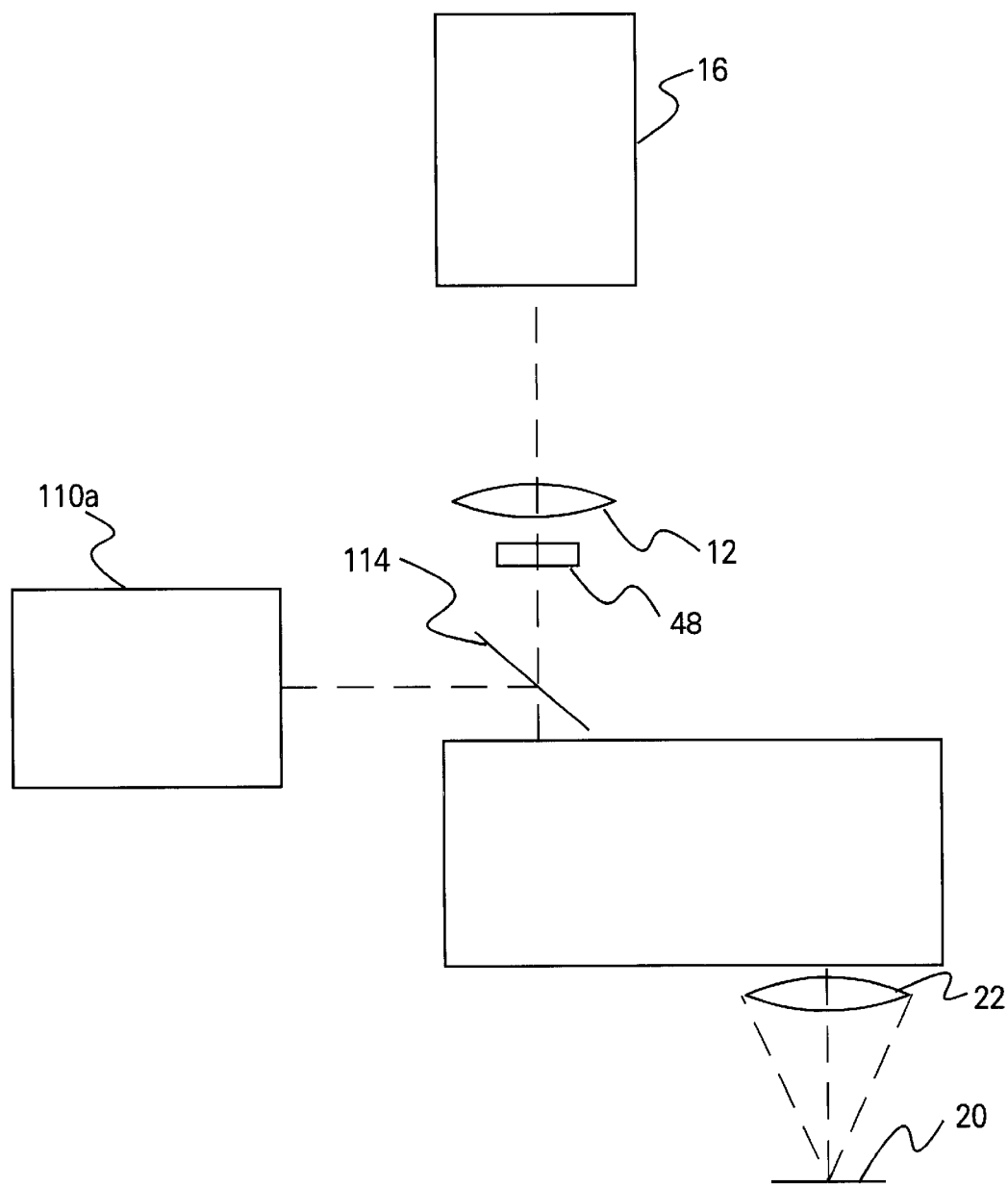
FIG. 10 depicts a wavelength multiplexed DIC microscope that uses a single detector and sequential acquisition of the data in two directions.

FIG. 10 is a modified version of FIG. 7, in which beam splitter 214b and detector 16x have been removed. The result is a system that has a single camera 16 viewing the field and has dual prisms 46x, 46y in 310a that are wavelength multiplexed. The system cannot acquire slope data in two shear directions simultaneously; however, switching the source 38 in 110a between two wavelengths allows for sequential acquisition of slope data in two shear directions.

There are many ways to select the source wavelength. For example, electronically switching between two different sets of LEDS (light emitting diodes) can be done without any moving parts. Another option is to change filters in front of a broad band source with a robust, simple mechanism that does not require precise alignment. In either case, the overall design is simple and robust with few moving parts.

An alternative to the fixed, dual prism setup is to select among prisms or a clear aperture on a slider or turret.

8. Simultaneous Acquisition of Slope Data in Two Directions Using DFOV Optics

Figure 11:
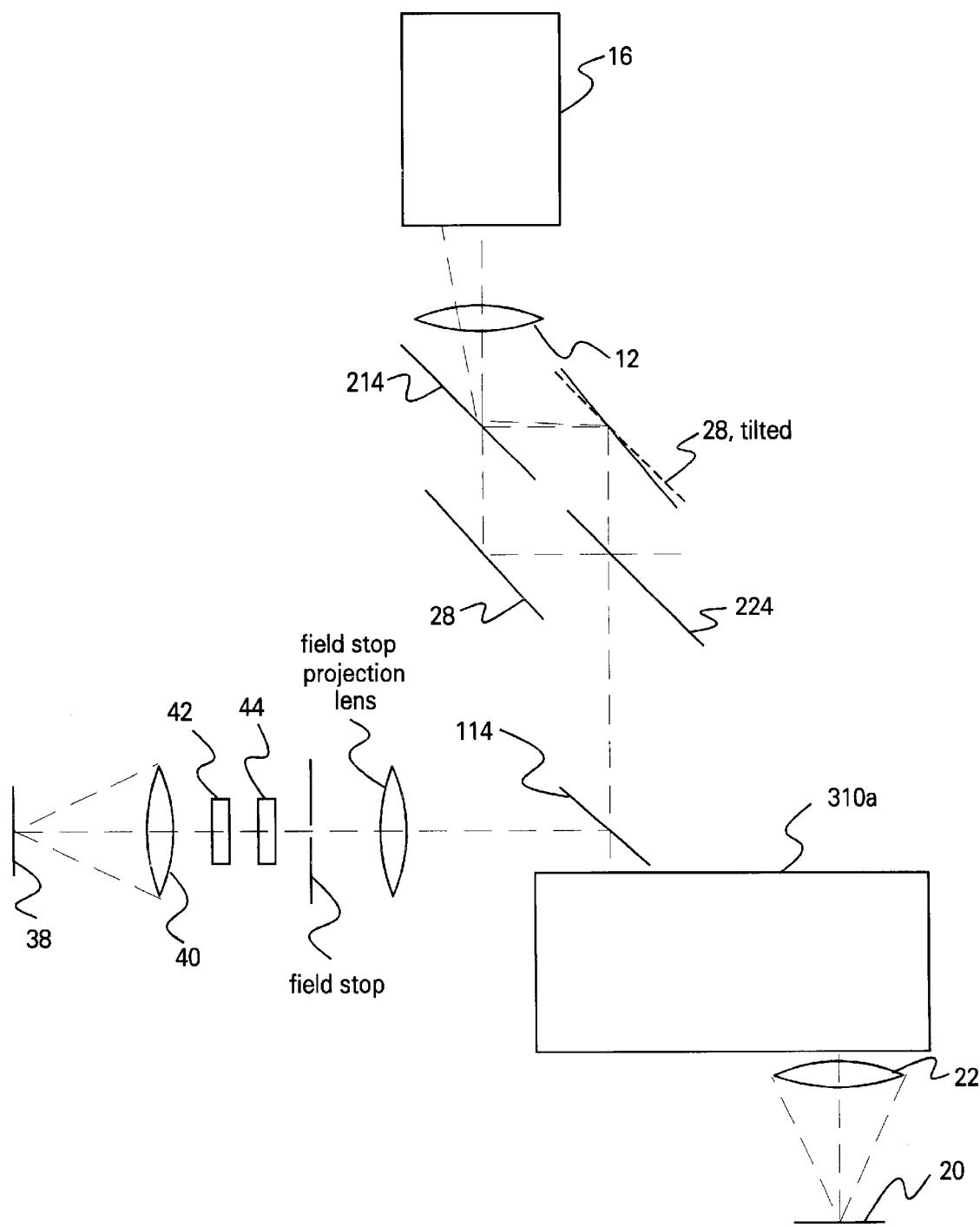
FIG. 11 depicts a wavelength multiplexed DIC microscope that uses a single detector and DFOV optics in conjunction with the detector to acquire simultaneously shear data in two directions.

The DFOV optics have been used in conjunction with two DIC prisms and the microscope objective as part of the means of wavelength multiplexing the shear direction on the sample. It is possible to also use a modified version of the DFOV optics with the detector so that simultaneous acquisition of slope data in two directions is accomplished using a single detector. Referring to FIG. 11, the DFOV optics in conjunction with the objective of any of the prior forms is possible as well as the multiplexed prism. A second set of DFOV optics comprised of two mirrors 28 and two wavelength selective beam splitters 214 and a tube lens 12. It is possible to place the tube lens in front of the DFOV optics as well. A requirement is that at least one mirror 28 is rotated so that the images from the two different shear directions are on different portions of the detector. Furthermore, a field stop 64 and a field stop projection lens 66 that projects the field stop and images the aperture stop onto a pupil of the objective 22 in the illumination arm are required so that the two images produced on the detector 16 do not overlap.

The benefit of this design is that only a single detector is used to simultaneously acquire slope data in two directions, thereby reducing size and cost of the instrument. However, the effective area of the sample that is captured is reduced by one-half.

9. Virtual Reference Surface

The DIC microscope system generates an imperfect measure of the surface. The errors can be represented as a surface by a table or polynomial representation. The use of a system error map—virtual reference surface—in units of height that is subtracted from the measured data is well known. The virtual reference surface can be stored as slope or height data. The virtual reference surface is stored in a computer provided with an image capture device. The virtual reference surface is a function of the focal position of the objective.

It may be preferable in some specific quantitative DIC instrument implementations to permit a focus motion of the objective that changes the distance between the DIC prism and the objective. A benefit of moving only the objective is reduced mass and potentially reduced focussing time. However, the distance between the DIC prism and the microscope objective strongly influences the shape of the virtual reference. Hence the need in some cases to use a virtual reference that is a function of focus position. In this case, the mechanisms for wavelength multiplexing the shear direction or shear magnitude on the sample and demultiplexing the resultant DIC images on the detector are not necessary.

There are various means of representing the virtual reference data (surface or slope). For example, a table of two or more virtual references for specific focus positions can be stored and the necessary correction interpolated for focus positions between stored locations. It is also possible to extrapolate a small distance beyond the particular focus positions. The number and position of virtual reference tables is selected to satisfy a maximum error limit on the actual surface measurement.

Another possible representation of the virtual reference data is to generate a polynomial for each sample location that is a function of focus position. The preferred method is to use a small polynomial set that is a function of image coordinate to represent the virtual reference surface error for each particular focus position and slope direction. An additional table to represent high frequency error corrections could be stored when needed by some applications.

Thus, the following embodiments are possible. In one embodiment, the virtual reference:

(a) is represented as a table that is a function of pixel coordinate, (b) two or more said tables are stored for two or more different focal positions for each shear direction and applied to slope data or a single table is stored and applied to surface data after integration of slope data to a surface, and (c) the correction is interpolated for-a current focal position.

In another embodiment, the virtual reference:

(a) is represented as a polynomial that is a function of pixel coordinate, (b) coefficients of the polynomials are stored for two or more different focal positions for each shear direction and applied to the slope data or a single table is stored and applied to surface data after integration of slope data to a surface, and (c) the correction is interpolated for the current focal position.

In yet another embodiment, the virtual reference:

(a) is represented as a combination of a polynomial and a table that is a function of pixel coordinate, (b) coefficients of the polynomials and tables are stored for two or more different focal positions for each shear direction and applied to the slope data or a single table is stored and applied to the surface data after integration of slope data to a surface, and (c) the correction is interpolated for the current focal position.

In still a further embodiment, the virtual reference:

(a) is represented as a polynomial for each pixel coordinate and is a function of focal position, and (b) coefficients of the polynomials are stored for each pixel for each shear direction and applied to the slope data or a single table is stored and applied to the surface data after integration of slope data to a surface.

10. Multiple Wavelength Quantitative DIC Microscope

The idea of using two different wavelengths to synthesize an effective wavelength that is longer than either of the two real wavelengths is disclosed by Wyant et al in U.S. Pat. No. 4,832,489, "Two-Wavelength Phase Shifting Interferometry". This was done in reference to phase shifting interferometry—a method for measuring the height of a surface or phase of a wavefront. Their goal was to measure surfaces, such as aspheric mirrors, whose slope exceeds the limit of a standard phase-shifting interferometer.

Figure 12:
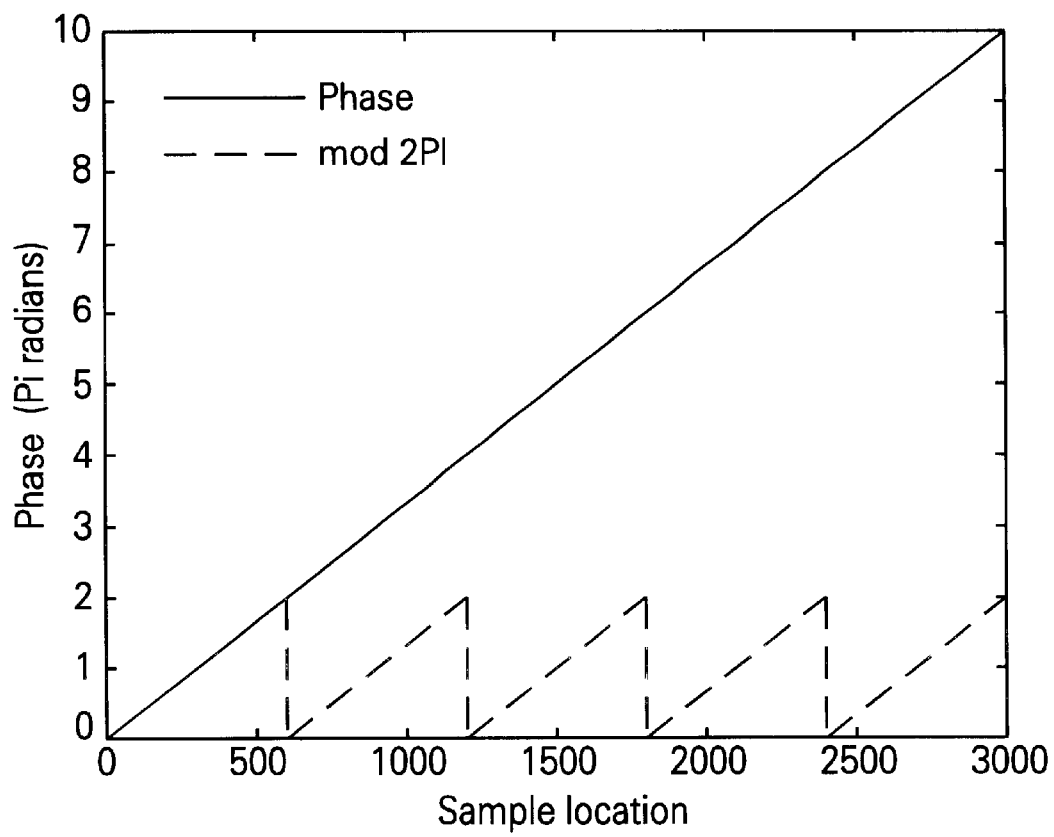
FIG. 12, on coordinates of phase (in $\pi$ radians) and sample location (in 500 samples per $2\pi$ height change), is a plot of a perfect surface height profile vs. sample location in arbitrary units.

In phase shifting interferometry, several images are acquired, usually with a controlled phase modulation between the images. Referring to FIG. 12, the height profile of a surface is expressed in phase. The solid line represents an imaginary surface having a height change of $10\pi$ radians over the range of sample positions. Using the known phase modulation and an appropriate algorithm (see, for example, Chapter 14 of Optical Shop Testing, $2^{nd}$ edition, Daniel Malacara, ed. John Wiley & Sons, 1992), it is possible to calculate the phase at each point of the detector array. However, the calculated phase, which is directly proportional to surface height, is known modulo $2\pi$, which is shown in FIG. 12 by the dashed line, and is sometimes referred to as wrapped phase data. Unwrapping is the process of taking the phase data modulo $2\pi$ and reconstructing the surface (smooth line). However, if the slope of the surface is large enough to cause more than a $\pm\lambda/4$ height or equivalently a $\pm\pi/2$ phase change per detector spacing, correct unwrapping is often not possible. Since an increase in wavelength decreases the phase for a fixed surface height, a longer wavelength can be used to increase the unambiguous measurement range of an instrument.

The embodiment disclosed herein is directed to measuring at multiple wavelengths in a quantitative DIC microscope and to manipulating the data so that it is as if the data were taken at a longer, synthetic wavelength, thereby increasing the measurement range of a DIC microscope. The mathematics from the above-mentioned Wyant et al patent applies directly to the DIC configuration. The first step in quantitative DIC microscopy is to calculate a phase value $\phi_1$ for wavelength $\lambda_1$ using, for example the method of Hong et al. Then, according to Hong et al, the slope is calculated from the phase value by using the known shear distance $\Delta x_1$.

$$f_1'(x, y) = \frac{\partial f(x, y)}{\partial x_1} = \left(\frac{\phi_1(x, y)}{2\pi} + m\right)\frac{\lambda_1}{2\Delta x_1}. \quad (1)$$

Hong et al assume that m, which is an integer, is zero, thereby limiting the slope of the surface being measured. Multiple wavelength DIC obtains a second phase value $\phi_2$ for wavelength $\lambda_2$ and then calculates $$\lambda_{EQ} = \frac{\lambda_1 \lambda_2}{|\lambda_1 - \lambda_2|} \quad (3)$$

according to the Wyant et al patent. The calculation of the slope from the phase data then proceeds using $\phi_{EQ}$ in place of $\phi_1$. The dynamic range of the measurement is increased because the requirement is now that m is zero for the longer equivalent wavelength $\lambda_{EQ}$ even if m is a nonzero integer for the measurement wavelengths $\lambda_1$ and $\lambda_2$. For each shear direction that is measured at two wavelengths in DIC microscopy or shearing interferometry, a longer wavelength can be synthesized to permit the correct measurement of a surface with larger local slopes than otherwise possible.

Some common path interferometers (DIC microscopes for example) can use incoherent sources rather than a coherent source (laser) referred to by Wyant et al. As a result, one can change the wavelength in a DIC microscope by simply selecting a different filter. This results in the ability to arbitrarily select two different wavelengths within a broad range and synthesize a broad range of wavelengths in a nearly continuous fashion. It is also possible to select wavelengths by switching between different colored light emitting diodes (LEDs). There is greater ease of implementation and selection of synthetic wavelengths possible in a DIC interferometer or other commonpath interferometer as compared to a phase shifting interferometer that requires a laser as a source of coherent light. Additional wavelengths ($\lambda_3$ and so on) can be used to synthesize additional equivalent wavelengths $\lambda_{EQ,1}$ and $\lambda_{EQ,2}$ and so on in like manner. The same operations as in Eqns. 2 and 3 can be applied to $\lambda_{EQ,1}$ and $\lambda_{EQ,2}$, again to synthesize still longer wavelengths.

The use of multiple wavelength DIC increases the flexibility of the instrument by permitting the measurement of surfaces having greater slope than otherwise possible. This is a benefit in quantitative DIC microscopes that measure shear in either one or two directions. Measurement of slope in a single direction is useful for obtaining profile data of a sample, while measurement in two directions is necessary to obtain the topography of a surface in general.

The Wyant et al disclosure and patent claims are limited to requiring "illuminating a reference mirror via a reference arm of the interferometer and illuminating a test surface via a test arm of the interferometer . . . " [Wyant et al, '489, Claim 1(a)]. DIC microscopy and shearing interferometry do not illuminate both a test and reference arm; rather, two locations from the sample surface are compared with each other interferometrically.

11. Multiple Shear Distance DIC

In DIC microscopy, It is possible to realize virtually any shear distance as well as any wavelength in a DIC microscope, but a phase-measuring interferometer can only adjust wavelength to vary sensitivity and measurement range. The ability to change wavelength is a cornerstone of the multiple wavelength technique; however, DIC microscopy can also vary shear distance by prism selection as well as changing the focal length of the objective. This ability provides the possibility of taking two or more measurements in the same direction with different shear distances and extending the measurement range of a DIC microscope.

In multiple wavelength DIC, the shear distances are assumed the same or at least the variation of shear distance with wavelength is small enough to be ignored. As a result, one can calculate a phase difference at two wavelengths and apply the Wyant et al mathematics to synthesize a phase difference utilizing a much longer wavelength, which is then used to calculate surface slope.

When two different shear distances, but the same direction are used with possibly different wavelengths, two estimates of surface slope are obtained. It is possible that the phase difference exceeds the measurement range at one or both shear distances meaning that the integer m in Eqn. 1 is nonzero. However, there is only one correct slope value for a particular location on the surface. Rewriting Eqn. 1 for a second shear distance and a second, possibly different wavelength results in $$f_2' = \frac{\partial f(x, y)}{\partial x_2} = \left(\frac{\phi_2(x, y)}{2\pi} + n\right)\frac{\lambda_2}{2\Delta x_2}. \quad (4)$$

Manipulating the preceding equation we obtain $$f_2' = \frac{\partial f(x, y)}{\partial x_2} = \left(\frac{\phi_2(x, y)}{2\pi} + n\right)\frac{\lambda_2'}{2\Delta x_1}, \quad (5)$$

Where $$\lambda_2' = \lambda_2 \frac{\Delta x_1}{\Delta x_2}. \quad (6)$$

This means that if phase value $\phi_2$ for wavelength $\lambda_2$ and $\Delta x_2$ is assumed to taken at $\lambda_2'$ and $\Delta x_1$, then multiple shear distance data can be manipulated as if it were single shear distance, multiple wavelength data with $$\lambda_{EQ} = \frac{\lambda_1 \lambda_2'}{|\lambda_1 - \lambda_2'|}. \tag{8}$$

Thus, there have been disclosed improved DIC microscope systems. It will be readily apparent to those skilled in this art that various changes and modifications of an obvious nature may be made, and all such changes and modifications are considered to fall within the scope of the present invention, as defined by the appended claims.

References.

The following references are considered to be relevant to the present disclosure; many of these references are discussed above at appropriate locations:

Gao Hong et al, supra (this paper presents the math and data for quantitative differential interference contrast microscopy);

Delbert L. Lessor et al, supra;

Handbook of Optics, $2^{nd}$ ed.; McGraw-Hill, Chapter 17 (1995);

"Microscopes", Bryngdahl, U.S. Pat. No. 3,873,207 (discloses a polarization interferometer and the use of a rotating polarizer to control phase shift between the interfering beams);

Miles V. Klein, supra (a brief discussion on interference contrast microscopy; the schematic diagram and discussion describe polarization at 45 degrees to the shear direction but do not describe which way (clockwise or counterclockwise), since they are equivalent. Similarly, polarization angle (the final analyzer) can be fixed and shear at 45 degrees to the analyzer in either of two directions.);

Katherine Creath, Chapter 17 in Optical Shop Testing, $2^{nd}$ edition, Wiley, p 698 (1992) (Creath notes that Nomarski microscopes were used back in 1955 for qualitative surface topography; all other differential interference profilers described by her are mechanically scanned);

M. V. Mantravadi, Chapter 4, *Lateral Shearing Interferometers in Optical Shop Testing*, $2^{nd}$ edition, edited by Daniel Malacara, p 123–172 (1992) (an extensive discussion of surface reconstruction using shearing interferometers is provided. The need for slope data in two directions, usually perpendicular, is discussed. A text on introductory calculus explains how to derive two orthogonal slopes (vectors) from two non-parallel slopes (vectors)); and James C. Wyant et al, U.S. Pat. No. 4,832,489, *supra*.

What is claimed is:

1. A differential interference contrast (DIC) microscope system comprising:
   (a) an illumination source for illuminating a sample;
   (b) a lens system for viewing the illuminated sample, including an objective, defining an optical axis;
   (c) a DIC prism having a shear angle for separating an input light beam into two, orthogonally polarized output beams that are separated by the shear angle;
   (d) at least one detector system for receiving a sample image;
   (e) a mechanism for modulating the phase of the DIC image;
   (f) a mechanism for selecting the wavelength of light used in acquiring at least two sets of DIC data taken in a single shear direction; and
   (g) a mechanism for manipulating the multiple DIC data sets to synthesize data that appear to have been taken at a longer synthetic wavelength.

2. The DIC microscope of claim 1 wherein the different wavelengths are obtained with light emitting diodes operating at different wavelengths.

3. The DIC microscope of claim 1 wherein the different wavelengths are obtained with light filters having different band pass characteristics.

4. The DIC microscope of claim 1 wherein the different wavelengths are obtained with lasers operating at different wavelengths.

5. The DIC microscope of claim 1 wherein the shear direction is controlled by rotating the DIC prism to obtain multiple wavelength shear data in each of two shear directions.

6. The DIC microscope of claim 1 wherein the shear direction is selected by wavelength multiplexing to obtain multiple wavelength shear data in each of two shear directions.

7. The DIC microscope of claim 6 wherein a total of four wavelengths are employed, two wavelengths for one shear direction and two different wavelengths for the second shear direction.

8. The DIC microscope of claim 1 wherein the prism is replaced by at least two prisms on a movable slider for placing only one prism in the optical path at a time, with both prisms having shear in either the same or the opposite direction, but both prisms having different shear distances.

9. The DIC microscope of claim 8 wherein the same or different wavelengths are employed for each data set for providing two sets of phase data that appear to be taken using the same shear distance and different wavelengths, with application of two-wavelength equations to the data to permit synthesizing the longer synthetic wavelength.

10. The DIC microscope of claim 8 wherein the shear direction is selected by having four prisms on a slider, only one in the optical path at a time so that two sets of data with different shear distances may be obtained in each of two shear directions.

11. The DIC microscope of claim 8 in a microscope wherein the shear direction is selected by wavelength multiplexing and there are two or more prisms on each of two sliders to select shear distance for each of two shear directions.

12. The DIC microscope of claim 1 wherein multiple shear distance data is obtained from different shear distances with two objectives having different focal lengths.

13. The DIC microscope of claim 1 wherein multiple shear distance data is obtained from different shear distances with a change in focal length of the objective through the use of auxiliary optics.

* * * * *